(12) United States Patent
Batra et al.

(10) Patent No.: US 8,458,090 B1
(45) Date of Patent: Jun. 4, 2013

(54) DETECTING FRAUDULENT MOBILE MONEY TRANSACTIONS

(75) Inventors: Vishal S. Batra, Noida (IN); Dinesh Garg, Beawar (IN); Ravi Kothari, New Delhi (IN); Raghuram Krishnapuram, New Delhi (IN); Sumit Negi, New Delhi (IN); Gyana R. Parija, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/449,545

(22) Filed: Apr. 18, 2012

(51) Int. Cl.
*G06Q 40/00* (2012.01)
*G06Q 99/00* (2006.01)

(52) U.S. Cl.
CPC .............. *G06Q 40/00* (2013.01); *G06Q 99/00* (2013.01)
USPC ............................................ 705/39; 705/325

(58) Field of Classification Search
None
See application file for complete search history.

(56) References Cited

U.S. PATENT DOCUMENTS

| | | | | |
|---|---|---|---|---|
| 6,157,707 | A * | 12/2000 | Baulier et al. | 379/189 |
| 6,219,538 | B1 * | 4/2001 | Kaminsky et al. | 455/410 |
| 6,504,907 | B1 * | 1/2003 | Farris et al. | 379/35 |
| 7,403,922 | B1 | 7/2008 | Lewis et al. | |
| 7,610,040 | B2 | 10/2009 | Cantini et al. | |
| 7,620,596 | B2 | 11/2009 | Knudson et al. | |
| 7,856,494 | B2 | 12/2010 | Kulkarni et al. | |
| 8,179,798 | B2 * | 5/2012 | Alperovitch et al. | 370/232 |
| 2002/0161707 | A1 * | 10/2002 | Cole et al. | 705/42 |
| 2004/0008717 | A1 * | 1/2004 | Verma et al. | 370/432 |
| 2004/0122685 | A1 * | 6/2004 | Bunce | 705/1 |
| 2005/0288941 | A1 * | 12/2005 | DuBois et al. | 705/1 |
| 2006/0204051 | A1 * | 9/2006 | Holland | 382/115 |
| 2006/0294095 | A1 * | 12/2006 | Berk et al. | 707/6 |
| 2007/0133768 | A1 * | 6/2007 | Singh | 379/114.14 |
| 2007/0288355 | A1 * | 12/2007 | Roland et al. | 705/38 |
| 2008/0052226 | A1 * | 2/2008 | Agarwal et al. | 705/39 |
| 2008/0120688 | A1 * | 5/2008 | Qiu et al. | 726/1 |
| 2008/0175266 | A1 * | 7/2008 | Alperovitch et al. | 370/465 |
| 2009/0157454 | A1 * | 6/2009 | Carter et al. | 705/7 |
| 2009/0182652 | A1 | 7/2009 | Klein et al. | |
| 2009/0265198 | A1 * | 10/2009 | Lester et al. | 705/7 |
| 2010/0004981 | A1 | 1/2010 | Katz et al. | |
| 2010/0114744 | A1 * | 5/2010 | Gonen | 705/35 |
| 2010/0115040 | A1 * | 5/2010 | Sargent et al. | 709/206 |
| 2011/0047040 | A1 * | 2/2011 | Carlson et al. | 705/26.1 |
| 2011/0131122 | A1 * | 6/2011 | Griffin et al. | 705/35 |
| 2011/0137789 | A1 * | 6/2011 | Kortina et al. | 705/38 |
| 2011/0154497 | A1 * | 6/2011 | Bailey, Jr. | 726/25 |

(Continued)

OTHER PUBLICATIONS

Mobile Commerce, Wikipedia, http://en.wikipedia.org/wiki/Mobile_commerce, downloaded Apr. 18, 2012.

(Continued)

*Primary Examiner* — Gregory Johnson
(74) *Attorney, Agent, or Firm* — Ryan, Mason & Lewis, LLP

(57) ABSTRACT

A method, an apparatus and an article of manufacture for detecting a fraudulent mobile money transaction. The method includes determining a reputation score for at least one customer based on historical data, determining multiple patterns related to fraudulent mobile money transaction activities by using the reputation score and the historical data, automatically detecting at least one of the patterns in mobile money transactions incoming from at least one other customer, and classifying the at least one detected pattern as a fraudulent mobile money transaction or a genuine mobile money transaction.

20 Claims, 5 Drawing Sheets

U.S. PATENT DOCUMENTS

| | | | | |
|---|---|---|---|---|
| 2011/0173122 | A1* | 7/2011 | Singhal | 705/44 |
| 2011/0196791 | A1 | 8/2011 | Dominguez | |
| 2011/0208601 | A1* | 8/2011 | Ferguson et al. | 705/16 |
| 2011/0238564 | A1 | 9/2011 | Lim et al. | |
| 2011/0270756 | A1* | 11/2011 | Tullis et al. | 705/44 |
| 2011/0295722 | A1* | 12/2011 | Reisman | 705/27.1 |
| 2011/0313925 | A1* | 12/2011 | Bailey, Jr. | 705/44 |
| 2012/0109802 | A1* | 5/2012 | Griffin et al. | 705/35 |
| 2012/0150742 | A1* | 6/2012 | Poon et al. | 705/44 |
| 2012/0150748 | A1* | 6/2012 | Law et al. | 705/71 |
| 2012/0157042 | A1* | 6/2012 | McCanna et al. | 455/407 |
| 2012/0157062 | A1* | 6/2012 | Kim et al. | 455/414.1 |
| 2012/0209674 | A1* | 8/2012 | Neystadt et al. | 705/14.16 |
| 2012/0226590 | A1* | 9/2012 | Love et al. | 705/30 |
| 2012/0233665 | A1* | 9/2012 | Ranganathan et al. | 726/4 |
| 2012/0244885 | A1* | 9/2012 | Hefetz | 455/456.2 |
| 2012/0296692 | A1* | 11/2012 | O'Malley et al. | 705/7.28 |
| 2012/0310831 | A1* | 12/2012 | Harris et al. | 705/44 |

OTHER PUBLICATIONS

Money Laundering, Wikipedia, http://en.wikipedia.org/wiki/Money_laundering, downloaded Apr. 18, 2012.

Mobile Payment, Wikipedia, http://en.wikipedia.org/wiki/Money_payment, downloaded Apr. 18, 2012.

Mobile Payments—A Growing Threat, International Narcotics Control Strategy Report, U.S. Department of State, Mar. 2008.

Hamblen, Mobile Commerce Growth Outpaces Anti-Fraud Tools, Gartner Says, ComputerWorld, Sep. 2010.

Bold, Tackling Fraud, Money Laundering and Terrorism Financing in Mobile Banking, CGPA, Jan. 2011.

Mobile Money Transfer & Remittances—Markets, Forecasts & Vendor Strategies 2011-2015, Juniper Research Report, Jan. 2011.

Anomaly Detection at Multiple Scales (ADAMS), DARPA Grant, downloaded Apr. 18, 2012.

Solin, Mobile Money: Methodology for Assessing Money Laundering and Terrorist Financing Risks, GSMA Discussion Paper, Jan. 2010.

Aggarwal et al. Outlier Detection in Graph Streams, ICDE 2011.

Akoglu et al. OddBall: Spotting Anomalies in Weighted Graphs, PAKDD 2010.

Akoglu et al., Event Detection in Time Series of Mobile Communication Graphs, Army Science Conference, 2010.

Iris 3.0 Fraud Prevention for Payment Processing, Oct. 5, 2005, http://solusmart.com/data_sheets/13.pdf.

* cited by examiner

DETECTING FRAUDULENT MOBILE MONEY TRANSACTIONS

FIELD OF THE INVENTION

Embodiments of the invention generally relate to information technology, and, more particularly, to mobile monetary transactions.

BACKGROUND

Mobile money transactions are vulnerable to various forms of fraud. Existing approaches for carrying out mobile money transactions include, for example, a Telco-centric model, wherein a customer can pay for various utility bills. In such an approach, money is loaded physically by a customer visiting a Telco outlet, and the mobile components are maintained by Telco. Another existing approach includes a bank-centric model, wherein a customer can pay for various utilities. In such an approach, money is loaded physically by a customer visiting a bank branch, and accounts are maintained by banks.

As noted, however, existing approaches are vulnerable to various mechanisms for fraud. For example, money laundering is the practice of disguising the origins of illegally-obtained money, and can often include stages of placement, layering, and integration (PLI). Placement (P) refers to introducing the money into a financial system by some means (for example, remittance center in m-transfer). Layering (L) refers to carrying out financial transactions in a complex manner in order to camouflage the source of the money. Integration (I) refers to acquiring wealth generated from this process (for example, pick up the money from licensed center or use the credit against some services/product purchase).

Additional mechanisms for fraud can include transaction interception or inappropriate entry into a mobile financial service provider (MFSP) system, an agent and/or customer defrauding the MFSP system (an agent can sign as a fictitious customer, an agent can divide a single deposit into multiple small deposits, etc.), an agent defrauding customers (charging the customers excessive rates, faking a cash-in transaction, stealing customer money, etc.), an outside party defrauding a customer (for example, a customer's personal identification number (PIN), account number, and/or phone is stolen by a third party), and privacy violations occurring in connection with customers' confidential information.

Accordingly, a need exists for detecting and preventing fraudulent mobile money transactions.

SUMMARY

In one aspect of the present invention, techniques for detecting fraudulent mobile money transactions are provided. An exemplary computer-implemented method for detecting a fraudulent mobile money transaction can include steps of determining a reputation score for at least one customer based on historical data, determining multiple patterns related to fraudulent mobile money transaction activities by using the reputation score and the historical data, automatically detecting at least one of the patterns in mobile money transactions incoming from at least one other customer, and classifying the at least one detected pattern as a fraudulent mobile money transaction or a genuine mobile money transaction.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes automatically detecting and preventing fraudulent mobile money transactions in near real-time. As used herein, near real-time can refer to a situation wherein if a transaction is fraudulent, it will be detected within a bounded time delay from the point in time when a customer initiates the request for that transaction. The bounded delay guarantee that can be achieved depends on various parameters including hardware configuration, volume of the transactions, and the rate at which these transactions are being carried out by the customers.

At least one embodiment of the invention includes identifying potential enterprise risks through detecting anomalous mobile money transactions (MMT) in near real-time. Enterprise risk is controlled by flagging such anomalous MMT transactions with different levels of severity based on the system's confidence about a particular activity being fraudulent and its potential impact.

Additionally, as described herein, an aspect of the invention includes an anomaly detection system that learns and detects anomalous and/or suspicious MMT transactions activities in near real-time. Also, at least one embodiment of the invention includes a near real-time decision support system to help reduce MMT frauds by recommending actions for suspicious MMT transactions based on the corresponding severity and impact. Aspects of the invention further include facilitating integration of a domain expert's knowledge about money laundering (ML) or unlawful financing scenarios/pattern, as well as developing a key performance indicator (KPI) and evaluation framework for measuring effectiveness of a solution. In at least one embodiment of the invention, domain expert's knowledge can be leveraged to reinforce system accuracy.

Additionally, aspects of the invention can also include detecting patterns of ML in an automated manner, as well as automatically classifying MMT transactions that are determined likely to be ML. As detailed herein, at least one embodiment of the invention also includes computing reputation scores in one possible manner (which can be used for a variety of enterprise purposes).

Figure 1:
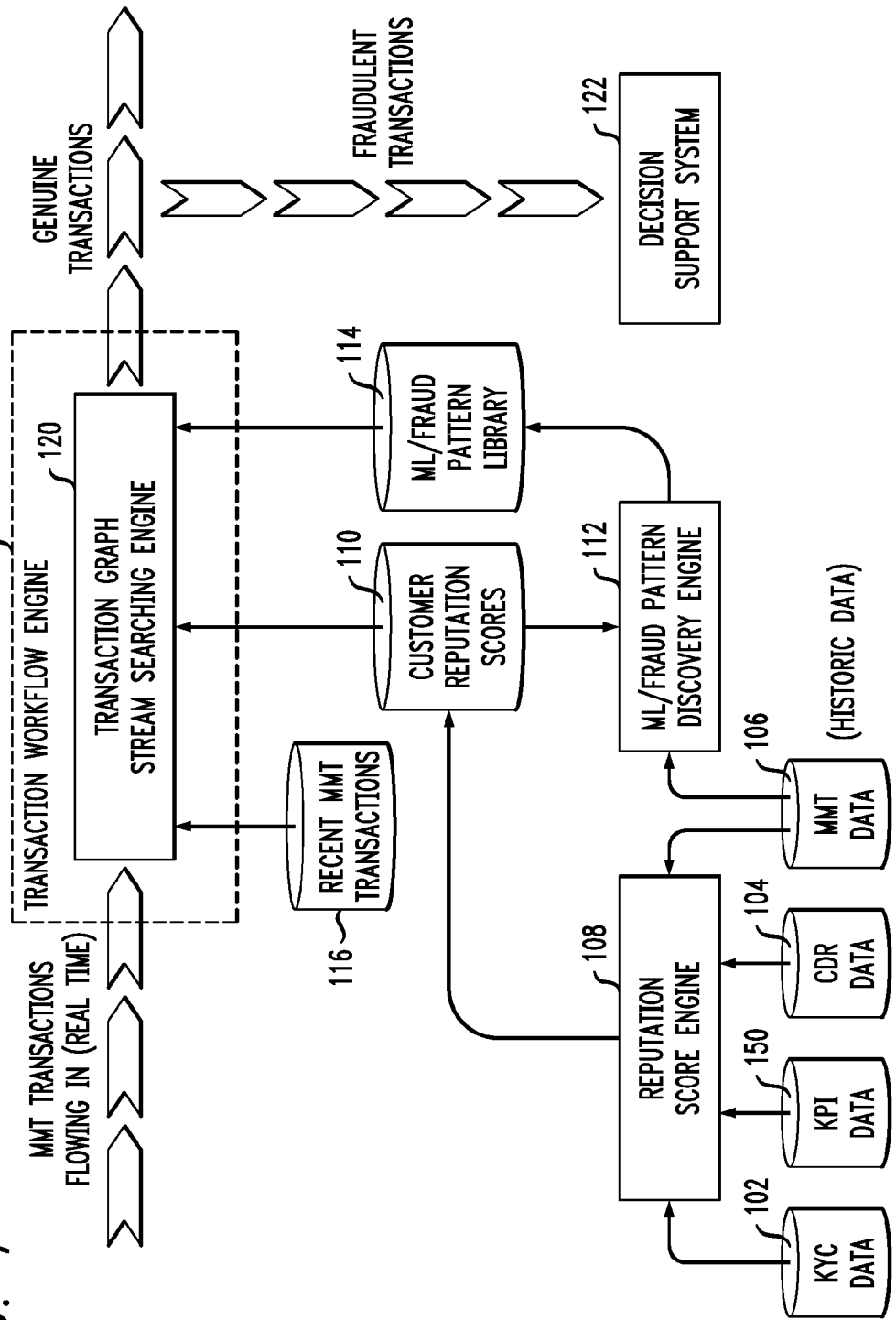
FIG. 1 is a block diagram illustrating an example embodiment, according to an aspect of the invention.

FIG. 1 is a block diagram illustrating an example embodiment, according to an aspect of the invention. By way of illustration, FIG. 1 depicts historical data including a know-your-customer (KYC) database 102, a key performance indicator (KPI) database 150, a call detailed records (CDR) database 104 and a MMT database 106, which provide input to a reputation score engine module 108. KPI data indicates how customers are performing along various dimensions including service usage pattern, inactivity pattern, recharge pattern, etc. Also, in at least one embodiment of the invention, it should be appreciated that any other data sources that describe customer behavior can also be included in this stage.

The reputation score engine 108 generates a customer reputation score and stores it in database 110. FIG. 1 also depicts a fraud pattern discovery engine module 112, which receives input from the MMT database 106 and customer reputation score database 110, and outputs a fraud pattern that is stored in library database 114.

Additionally, FIG. 1 depicts a transaction workflow engine 118, which receives MMT transactions in real-time. Also, transaction workflow engine 118 includes a transaction graph stream searching engine 120, which receives input from a recent MMT transactions database 116, customer reputation scores database 110 and fraud pattern library database 114, and outputs genuine transactions as well as fraudulent transactions, which are sent to a decision support system module 122.

As depicted by component 108 in FIG. 1, an aspect of the invention includes a reputation score engine. In at least one embodiment of the invention, the reputation score engine can operate manually, via oracle, and/or in connection with a learning approach. Accordingly, in an example embodiment of the invention, the reputation scores can be manually assigned. In another example embodiment of the invention, the reputation scores can be supplied directly by an oracle. Further, in yet another example embodiment of the invention, the reputation scores can be computed by the system, which can implement an appropriate learning scheme to learn the reputation score of a customer.

Figure 2:
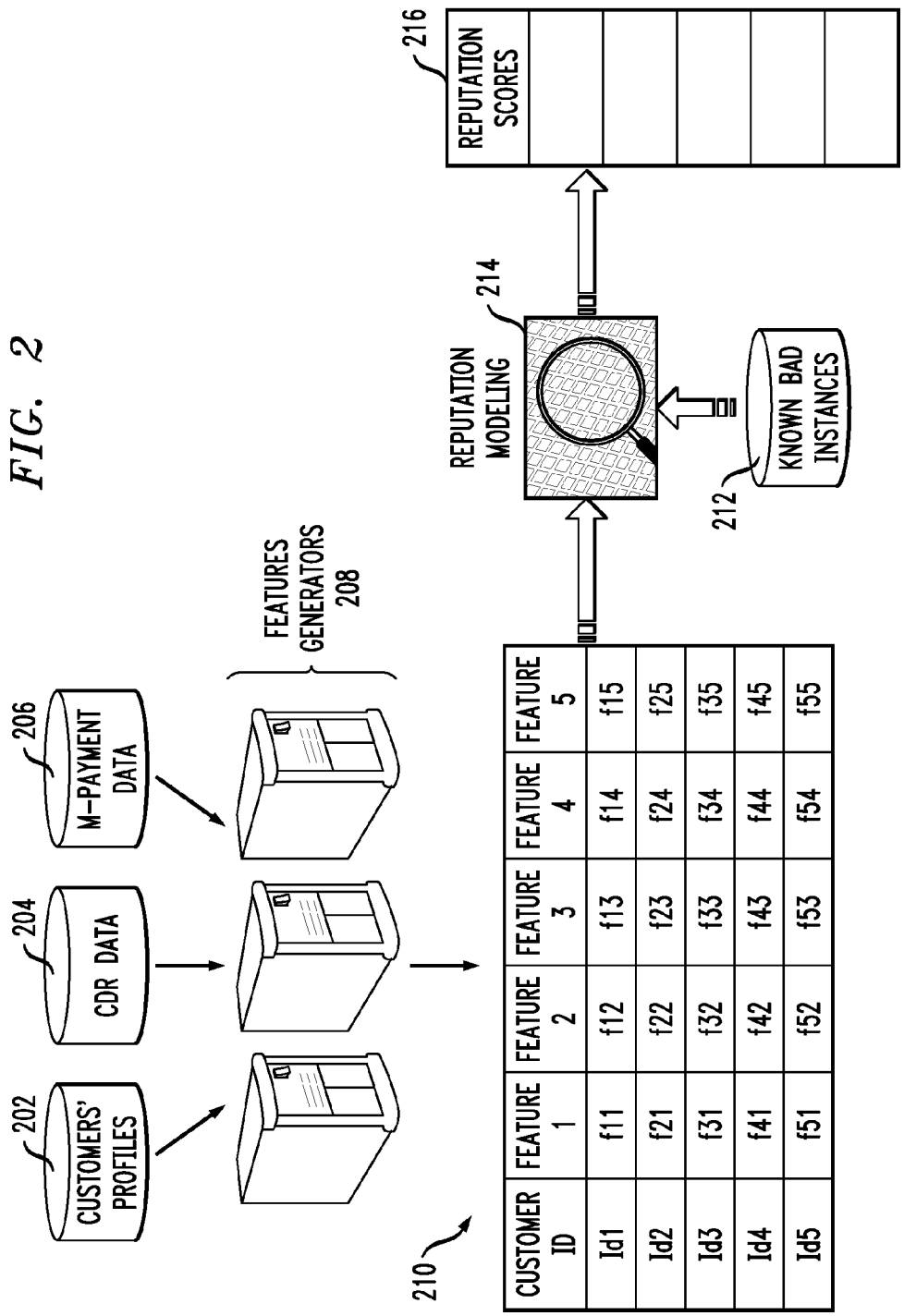
FIG. 2 is a diagram illustrating reputation score engine components, according to an embodiment of the invention.

FIG. 2 is a diagram illustrating reputation score engine components, according to an embodiment of the invention. By way of illustration, FIG. 2 depicts an example learning based method for generating reputation scores via a reputation score engine. Specifically, FIG. 2 depicts a customer profile database 202, a CDR data database 204 and a mobile-payment (m-payment) data database 206, which provide input to features generators 208. As used herein, customer profile data refers to any kind of data that describe customer behavior, including KYC, KPI data, etc.

Features generators 208 produce a chart 210 illustrating customer identifiers (IDs) and corresponding features, which is input, along with information from a known bad instances database 212, to a reputation modeling module 214. The reputation modeling module 214 generates reputation scores 216. In accordance with at least one embodiment of the invention, an effective algorithm for generating a reputation score includes learning a regression function which maps the feature values of a customer to its reputation scores. For example, a known bad instance provides sample points through which this regression function can pass.

Additionally, as depicted by component 112 in FIG. 1, an aspect of the invention includes a fraud pattern discovery engine. Accordingly, in at least one embodiment of the invention, ML patterns can be classified along different dimensions. One such dimension can include location in the PLI mechanism, leading to placement patterns, layering patterns and integration patterns. Another dimension can include network versus non-network, leading to patterns using non-network related features, patterns that only use features related to the network, and patterns using both network and non-network features.

In accordance with at least one embodiment of the invention, a pattern discovery engine populates a pattern library through any one (or a combination) of the following methods: manual population (for example, via domain experts), population via known bad instances in the past, population via an oracle, and population via a learning-based method. As used herein, a bad instance refers to a known pattern for ML activity and/or a known pattern for fraudulent transactions.

Figure 3:
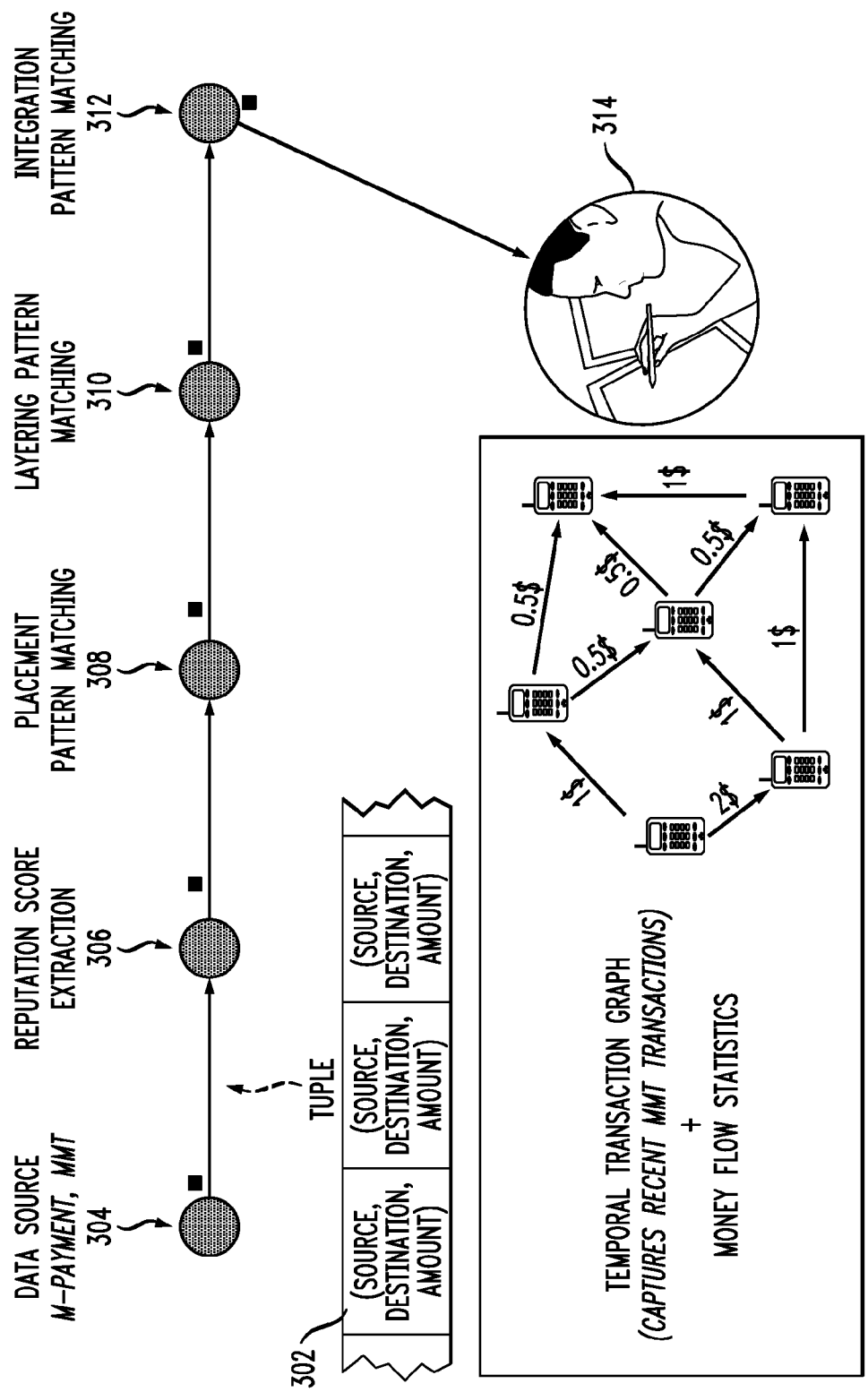
FIG. 3 is a diagram illustrating components of an example graph stream searching engine, according to an embodiment of the invention.

FIG. 3 is a diagram illustrating components of an example graph stream searching engine, according to an embodiment of the invention. By way of illustration, FIG. 3 depicts an example illustrating the method of searching fraudulent patterns in an incoming stream of mobile money transactions. Component 302 represents a tuple contain source, destination and amount information. The data source 304 is a transaction work flow engine, which listens to the customer requests and invokes the "Transaction Graph Stream Searching Engine" for every incoming transaction. Component 306 extracts the reputation scores from the database for the customers who are involved in the current transaction under scanning. These scores are overlaid with the transaction details and the bundle is forwarded to downstream component 308. Component 308 checks if this transaction (in conjunction, for example, with some transactions of the near past) is exhibiting any trace of fraudulent placement related to a placement aspect. Similar roles are played by components 310 and 312 except that these components check for layering patterns and integration patterns, respectively. Further, an output 314 can be generated.

Figure 4:
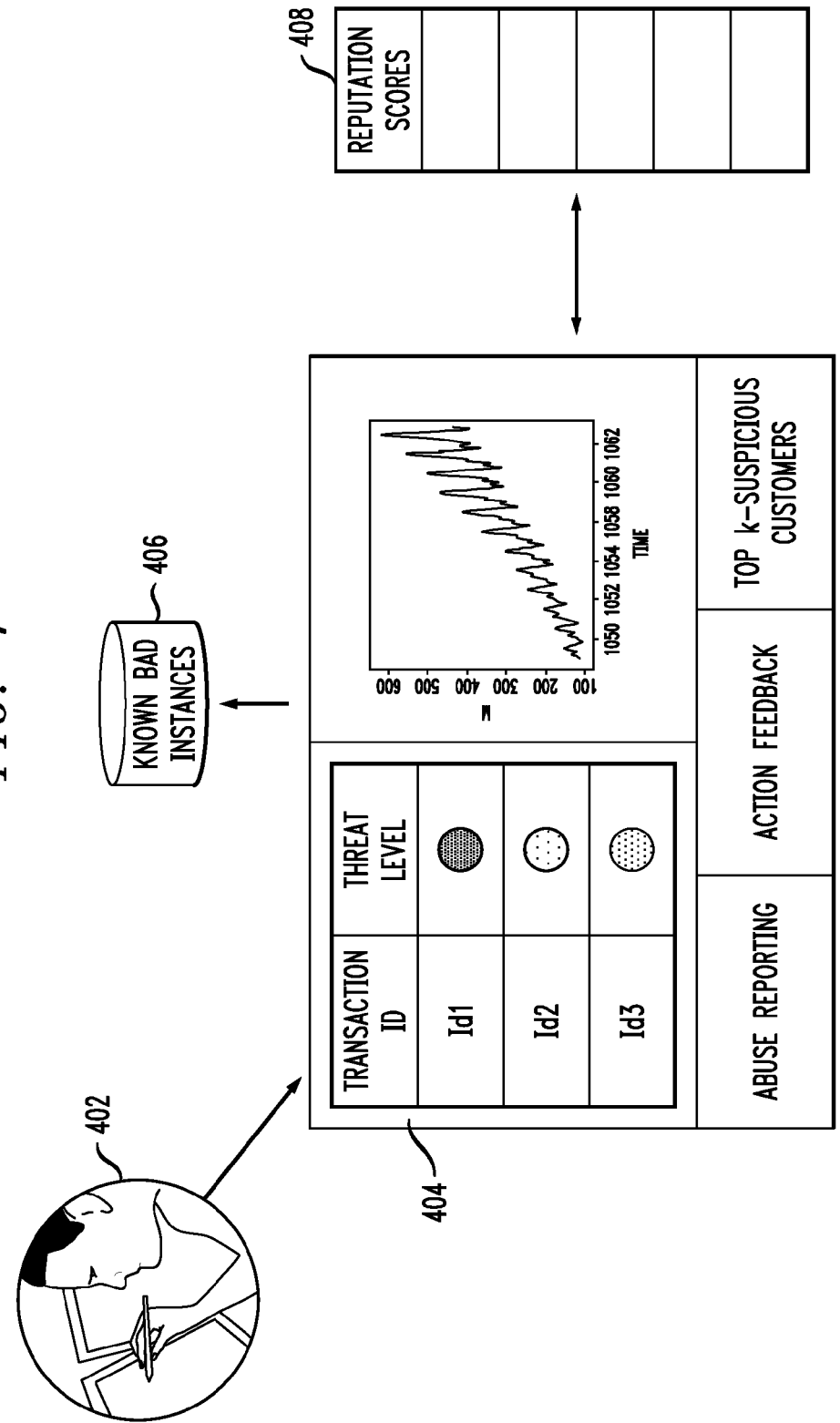
FIG. 4 is a diagram illustrating components of an example decision support system, according to an embodiment of the invention.

FIG. 4 is a diagram illustrating components of an example decision support system, according to an embodiment of the invention. By way of illustration, FIG. 4 depicts an example of a decision support system portal that helps a human agent take corrective/precautionary actions. The main portal is represented by component 404. This portal 404 maintains various statistics and also interacts with reputation score database 408, database 406 for the known bad (fraudulent) instances, as well as the output of the system depicted in FIG. 3, which is shown as component 402 here. Some of the statistics displayed by this example portal include "Top-k suspicious customer," "Top-k suspicious transactions in recent past," "The estimated level of risk/severity involved with each of these top-k transactions," "the action recommended for each of the Top-k fraudulent transactions," and "The feedback regarding findings of a human agent for every Top-k fraudulent transactions." It should be appreciated that various statistics can be used in embodiments of the invention.

Figure 5:
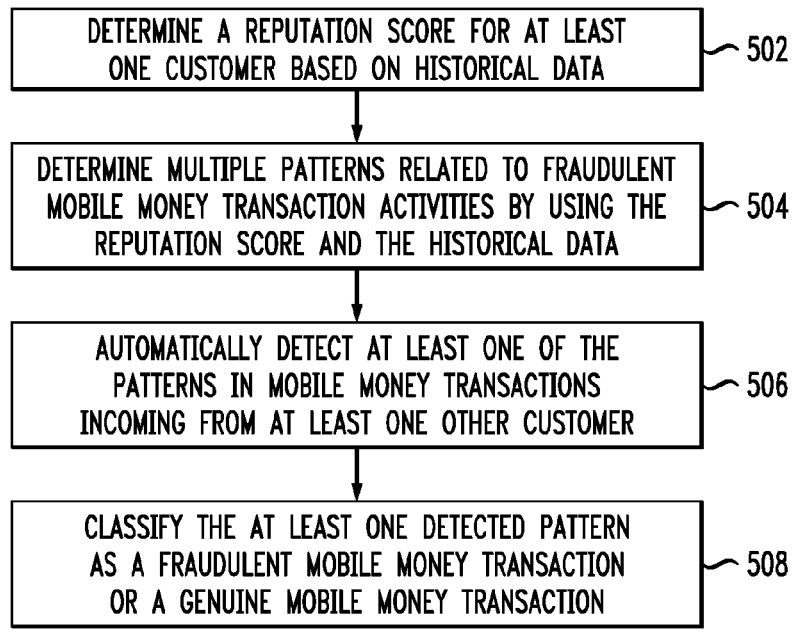
FIG. 5 is a flow diagram illustrating techniques for detecting a fraudulent mobile money transaction, according to an embodiment of the invention.

FIG. 5 is a flow diagram illustrating techniques for detecting a fraudulent mobile money transaction, according to an embodiment of the present invention. As described herein, fraud can include any form such as, for example, money laundering, unlawful financing, interception or inappropriate entry into a MFSP system, an outside party defrauding a customer, etc.

Step 502 includes determining a reputation score for at least one customer based on historical data. The reputation scores can be stored in a database, in accordance with at least one embodiment of the invention. Determining a reputation score for a customer based on historical data can include, for example, manually assigning the reputation score, obtaining the reputation score from an oracle, and/or employing a learning scheme to learn the reputation score for the at least one customer.

Step 504 includes determining multiple patterns related to fraudulent mobile money transaction activities by using the reputation score and the historical data. The patterns can be stored in a database, in accordance with at least one embodiment of the invention. By way of example, for customers with very low reputation scores, the corresponding feature values and corresponding manner by which they conduct the transactions set the baseline for discrimination between (possibly) genuine transactions and (possibly) fraudulent transactions. This boundary can be revised as more evidence (in the form of known bad/good instances) is obtained.

Determining patterns relating to fraudulent mobile money transaction activities can include categorizing money laundering patterns along multiple dimensions, such as categorizing patterns relating to placement, layering, and integration activities. Additionally, determining patterns relating to fraudulent mobile money transaction activities can include determining patterns based on non-network related features, network-only related features, and both non-network and network-only related features. Network, as used here, refers to the network of customers' phone call graph and also the network of customers' mobile money transaction graph.

Step 506 includes automatically detecting at least one of the patterns in mobile money transactions incoming from at least one other customer. Automatically detecting at least one of the patterns in mobile money transactions incoming from a customer can include automatically detecting the at least one of the patterns in near real time.

Step 508 includes classifying the at least one detected pattern as a fraudulent mobile money transaction or a genuine mobile money transaction. Additionally, at least one embodiment of the invention includes generating a risk score associated with the classified pattern, as well as outputting both items.

The techniques depicted in FIG. 5 can additionally include incorporating domain expert knowledge to reinforce classifying the at least one detected pattern as fraudulent or genuine. Also, at least one embodiment of the invention includes denoting each fraudulent mobile money transaction with a level of severity based on a determined confidence of the detected pattern classified as a fraudulent mobile money transaction and monetary impact involved with the fraudulent mobile money transaction. As detailed herein, confidence is determined by fusing two factors—the amount of money that is involved in the said transaction and how far this transaction is from the machine learned decision boundary of the fraudulent transactions versus genuine transactions.

Additionally, as detailed herein, at least one aspect of the invention can include facilitating a decision support system to aid a human agent to take at least one of a corrective and a precautionary action based on the at least one detected pattern.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
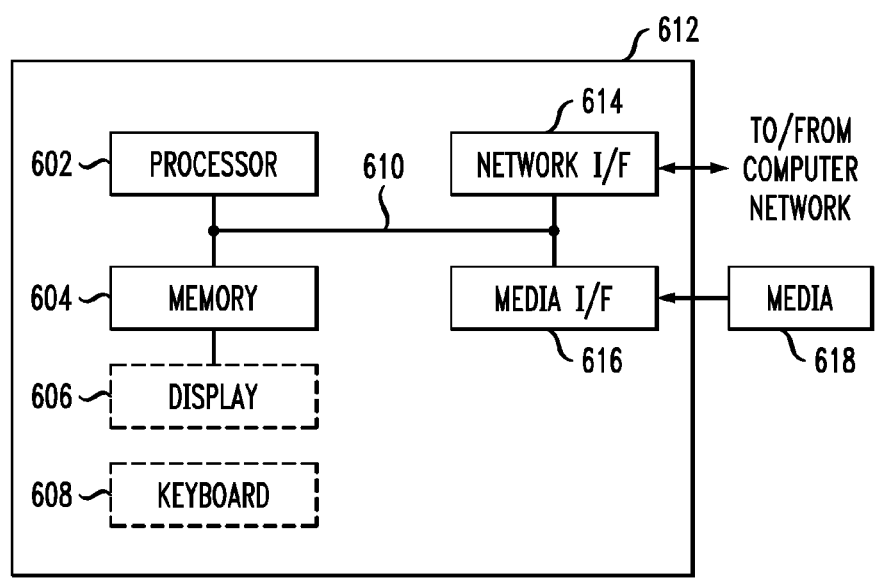
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, to partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the to computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, identifying potential enterprise risks via detecting anomalous MMT transactions in near real-time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a fraudulent mobile money transaction, the method comprising:
   determining a reputation score for at least one customer based on historical data;
   determining multiple patterns related to fraudulent mobile money transaction activities by using the reputation score and the historical data;
   automatically detecting at least one of the patterns in mobile money transactions incoming from at least one other customer; and
   classifying the at least one detected pattern as a fraudulent mobile money transaction or a genuine mobile money transaction;
   wherein at least one of the steps is carried out by a computer device.

2. The method of claim 1, comprising:
   generating a risk score associated with the classified pattern.

3. The method of claim 1, comprising:
   incorporating domain expert knowledge to reinforce classifying the at least one detected pattern as fraudulent or genuine.

4. The method of claim 1, wherein said classifying the at least one detected pattern comprises denoting each fraudulent mobile money transaction with a level of severity based on a determined confidence of the detected pattern classified as a fraudulent mobile money transaction and monetary impact involved with the fraudulent mobile money transaction.

5. The method of claim 1, comprising:
   storing the reputation score in a database.

6. The method of claim 1, wherein said determining the reputation score comprises manually assigning the reputation score.

7. The method of claim 1, wherein said determining the reputation score comprises obtaining the reputation score from an oracle.

8. The method of claim 1, wherein said determining the reputation score comprises employing a learning scheme to learn the reputation score.

9. The method of claim 1, wherein said determining multiple patterns comprises categorizing money laundering patterns along multiple dimensions.

10. The method of claim 9, wherein said categorizing money laundering patterns along multiple dimensions comprises categorizing patterns relating to placement, layering, and integration activities.

11. The method of claim 1, wherein said determining multiple patterns relating to fraudulent mobile money transaction activities comprises determining patterns based on non-network related features, network-only related features, and both non-network and network-only related features.

12. The method of claim 1, comprising:
storing the patterns in a database.

13. An article of manufacture comprising a computer readable storage medium having computer readable instructions tangibly embodied thereon which, when implemented, cause a computer to carry out a plurality of method steps comprising:
   determining a reputation score for at least one customer based on historical data;
   determining multiple patterns related to fraudulent mobile money transaction activities by using the reputation score and the historical data;
   automatically detecting at least one of the patterns in mobile money transactions incoming from at least one other customer; and
   classifying the at least one detected pattern as a fraudulent mobile money transaction or a genuine mobile money transaction.

14. The article of manufacture of claim 13, wherein the method steps comprise:
   incorporating domain expert knowledge to reinforce classifying the at least one detected pattern as fraudulent or genuine.

15. The article of manufacture of claim 13, wherein the method steps comprise:
   denoting each fraudulent mobile money transaction with a level of severity based on a determined confidence of the detected pattern classified as a fraudulent mobile money transaction and monetary impact involved with the fraudulent mobile money transaction.

16. The article of manufacture of claim 13, wherein determining the reputation score comprises employing a learning scheme to learn the reputation score.

17. A system for detecting a fraudulent mobile money transaction, comprising:
   a memory;
   at least one processor coupled to the memory; and
   at least one distinct software module, each distinct software module being embodied on a tangible computer-readable medium, the at least one distinct software module comprising:
      a reputation score engine module, executing on the processor, for determining a reputation score for at least one customer based on historical data;
      a pattern discovery engine module, executing on the processor, for determining multiple patterns related to fraudulent mobile money transaction activities by using the reputation score and the historical data; and
      a transaction workflow engine module, executing on the processor, for:
         automatically detecting at least one of the patterns in mobile money transactions incoming from at least one other customer; and
         classifying the at least one detected pattern as a fraudulent mobile money transaction or a genuine mobile money transaction.

18. The system of claim 17, further comprising:
   a decision support system module, executing on the processor, for facilitating a human agent to take at least one of a corrective and a precautionary action based on the at least one detected pattern.

19. The system of claim 17, wherein the transaction workflow engine module denotes each fraudulent mobile money transaction with a level of severity based on a determined confidence of the detected pattern classified as a fraudulent mobile money transaction and monetary impact involved with the fraudulent mobile money transaction.

20. The system of claim 17, wherein the reputation score engine module employs a learning scheme to learn the reputation score.

* * * * *